(12) United States Patent
Quero

(10) Patent No.: US 11,512,574 B1
(45) Date of Patent: Nov. 29, 2022

(54) PRIMARY PROPPANT FLOWBACK CONTROL

(71) Applicant: Halliburton Energy Services, Inc., Houston, TX (US)

(72) Inventor: Philippe Quero, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/566,827

(22) Filed: Dec. 31, 2021

(51) Int. Cl.
| | |
|---|---|
| *E21B 43/02* | (2006.01) |
| *E21B 43/267* | (2006.01) |
| *C09K 8/50* | (2006.01) |
| *C09K 8/508* | (2006.01) |

(52) U.S. Cl.
CPC ............ *E21B 43/267* (2013.01); *C09K 8/501* (2013.01); *C09K 8/508* (2013.01); *E21B 43/025* (2013.01)

(58) Field of Classification Search
None
See application file for complete search history.

(56) References Cited

U.S. PATENT DOCUMENTS

| | | | | |
|---|---|---|---|---|
| 3,747,678 A | * | 7/1973 | Waid .................. | C09K 8/56 166/295 |
| 5,595,245 A | * | 1/1997 | Scott, III ............ | E21B 49/008 166/308.1 |
| 7,153,575 B2 | | 12/2006 | Anderson et al. | |
| 7,350,571 B2 | | 4/2008 | Nguyen et al. | |
| 9,212,304 B2 | | 12/2015 | McDonald | |
| 2013/0062055 A1 | * | 3/2013 | Tolman ................ | E21B 43/119 175/4.51 |
| 2013/0075094 A1 | * | 3/2013 | Rankin .................. | E21B 21/10 166/281 |
| 2014/0374093 A1 | | 12/2014 | Nguyen et al. | |
| 2015/0114640 A1 | | 4/2015 | Bestaoui-Spurr et al. | |
| 2016/0153274 A1 | | 6/2016 | Hull et al. | |
| 2018/0223170 A1 | * | 8/2018 | Rama .................... | E21B 43/025 |

OTHER PUBLICATIONS

U.S. Appl. No. 16/343,848, filed Apr. 22, 2019.

* cited by examiner

*Primary Examiner* — Andrew Sue-Ako
(74) *Attorney, Agent, or Firm* — Thomas Rooney; C. Tumey Law Group PLLC

(57) ABSTRACT

Techniques of the present disclosure relate to proppant flowback control using a plug and perf completion. A method comprises disposing a resin in at least one cluster of fractures of a stage; disposing an activator for the resin in the stage; displacing the activator from the wellbore and into the at least one cluster of the stage with a plug attached to a perforating apparatus; setting the plug such that the resin and the activator are contained in the stage; and perforating a subsequent stage.

20 Claims, 4 Drawing Sheets

PRIMARY PROPPANT FLOWBACK CONTROL

BACKGROUND

Hydrocarbon producing wells may be stimulated by hydraulic fracturing treatments. In hydraulic fracturing treatments, a fracturing fluid is pumped into a producing zone of a subterranean formation such that one or more fractures are formed in the zone. Proppant, such as sand, for propping the fractures is suspended in the fracturing fluid such that the proppant is deposited in the fractures.

The proppant in the fractures prevents the fractures from closing resulting in conductive channels to produce formation fluid. However, many hydraulically fractured wells, especially unconventional wells, are facing proppant flowback issues, impacting production and damaging artificial lift equipment.

BRIEF DESCRIPTION OF THE DRAWINGS

These drawings illustrate certain aspects of some of the embodiments of the present method and should not be used to limit or define the method.

DETAILED DESCRIPTION

Figure 1:
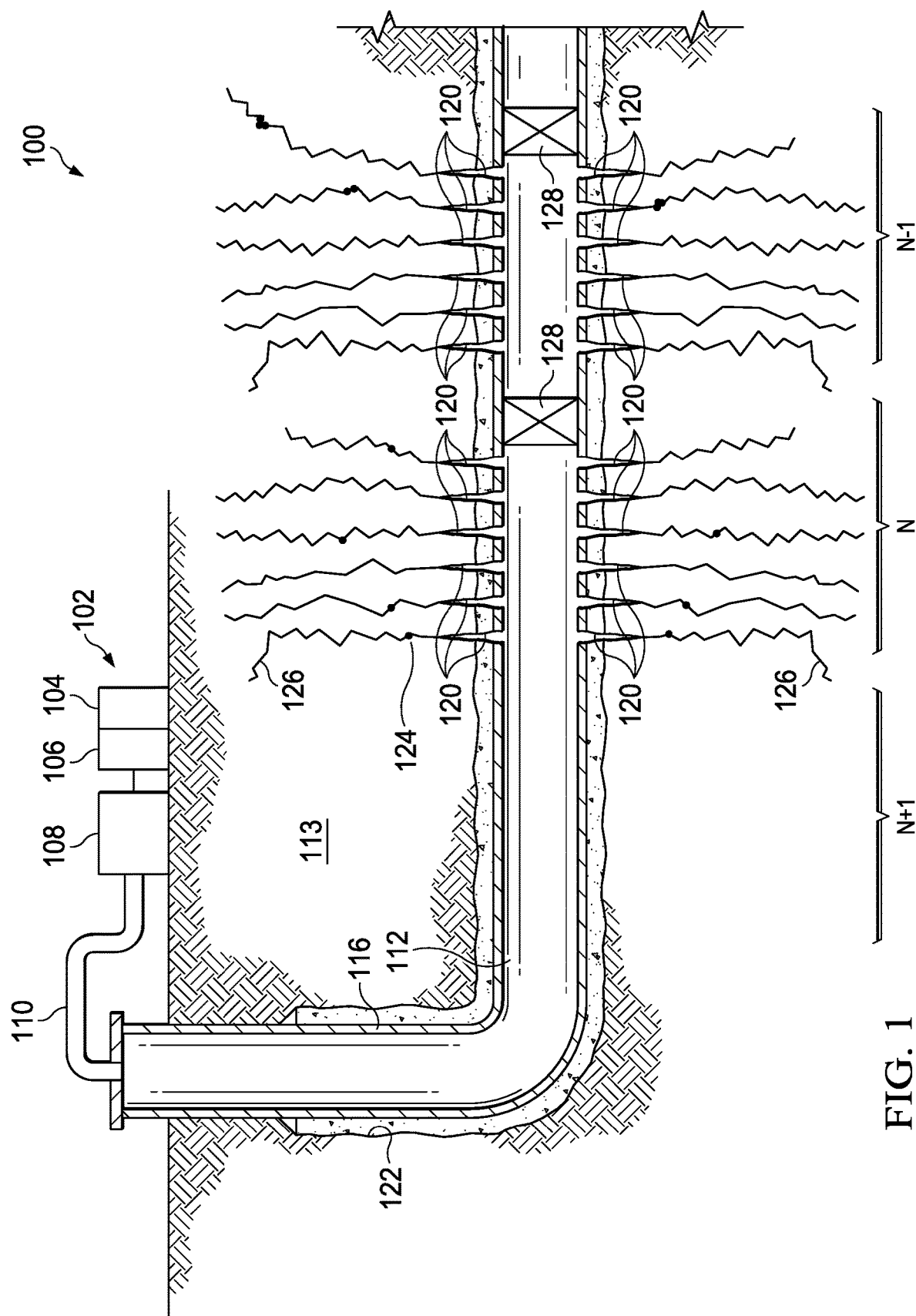
FIG. 1 illustrates an example of a system that may be used for hydraulically fracturing a subterranean formation, in accordance with examples of the present disclosure.

Methods of the present disclosure generally relate to treating at least one stage of a wellbore to reduce proppant flowback during a plug and perforation completion procedure ("plug and perf"). Plug and perf is a cased hole completion procedure that pumps down a plug and perforation gun to a desired stage in a wellbore. Once the plug is set, the perf gun fires into the casing, penetrating the subterranean section between the set plugs. Then hydraulic fracturing occurs, and frac fluid is pumped into this section. The process is repeated for each stage, until all the stages have been hydraulically fractured. Then, the plugs are drilled or milled out. In some examples, the plugs may be dissolvable.

The techniques as described herein employ the plug and perf procedure to dispose resin into the formation to control proppant flowback. These techniques are linked to the pump down equipment and use a separate consolidation process with the resin to control the proppant flowback, thereby allowing the frac equipment to remain resin free.

For example, stage N may be fractured with a proppant. After fracturing, a pre-flush may be pumped in the wellbore to prepare stage N for subsequent treatment. In some non-limiting examples, the pre-flush may include salt and a surfactant. Surfactants may include an anionic surfactant, a cationic surfactant, a zwitterionic surfactant, and any combination thereof. Anionic, cationic, and non-ionic surfactants impact the wettability of the rock/proppant. An objective of the surfactant is to make surfaces oil wet to enhance anchoring of the resin onto the treated surface. After pre-flush treatment, a resin may be pumped into the wellbore followed with a spacer and a resin activator.

Non-limiting examples of the resin include but are not limited to a two component epoxy based resin; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a hybrid polyester resin; a polyester copolymer resin; a polyurethane resin; a hybrid polyurethane resin; a polyurethane copolymer resin; an acrylate resin; and any combination thereof.

Non-limiting examples of the resin activator include an acid such hydrochloric acid, citric acid, malic acid, tartaric acid, acetic acid, phosphoric acid, maleic acid, lactic acid, ascorbic acid, acetic acid, carbonic acid, succinic acid, and/or benzoic acid. In some examples, an ester may be used as the activator. The spacer may include freshwater, saltwater (e.g., water containing one or more salts dissolved therein), brine (e.g., saturated saltwater produced from subterranean formations), seawater, or any combination thereof.

After disposal of the resin, the activator, and any spacer, a plug, such as a frac plug or bridge plug for example, attached to a perforating apparatus may be pumped down the wellbore to displace the activator into the clusters/formation. The activator may be slightly displaced into the formation.

After setting the plug, the perforating apparatus may detach from the plug to perforate another stage (e.g., N+1) for subsequent hydraulic fracking with proppant. That is, the perforating apparatus may be pulled up-hole to perforate N+1. The process may be repeated for any number of stages. Using the plug and perf method for controlling proppant flowback allows the frac equipment to remain resin free and is not linked to the frac equipment, rather the pump down equipment is used during the plug and perf.

FIG. 1 illustrates an example of a frac system 100, in accordance with examples of the present disclosure. The system 100 may be used for hydraulic fracturing operations. The system 100 includes a fluid handling system 102, which may include a fluid supply 104, mixing equipment 106, pumping equipment 108, and a wellbore supply conduit 110 coupled to a wellbore 112 extending into a subterranean formation 113. The wellbore 112 may include unconventional and/or conventional wells including horizontal, vertical, slanted, curved, and/or other types of wellbore geometries and orientations. In some examples, coiled tubing may be used to frack the well. The system 100 may be implemented offshore or onshore.

The wellbore 112 may include casing 116 that may be cemented within the wellbore 112 by cement sheath 118. Perforations 120 may extend from the casing 116, through the cement sheath 122, and into the formation 113. The pumping equipment 108 may be fluidly coupled with the fluid supply 104 and the wellbore supply conduit 110 to communicate various fluids/material into the wellbore 112.

Proppant 124 may be mixed with a fluid such as for example an aqueous base fluid via the mixing equipment 106, thereby forming a treatment fluid such as for example a fracturing fluid that may be pumped via the pumping equipment 108 from the fluid supply 104 down the wellbore 112 at or above a fracture gradient of the subterranean formation 113 to create (or enhance) at least one fracture (e.g., clusters 126) extending from the perforations 120.

Stage N can refer to the current stage in the wellbore 112 for treatment. Stage N−1 can refer to the previously treated stage and Stage N+1 can refer to the subsequent stage for treatment. Plugs 128 may separate each stage. Plugs 128 may include frac plugs or bridge plugs. The wellbore 112 may include dozens to hundreds of stages, each stage may include 6-12 clusters, for example. Each stage may extend 200 feet along the wellbore 112 from plug to plug, for example. Each cluster 126 may be spaced apart about 20 feet in some examples and include a cluster width of about 1 foot for each cluster.

Figure 2:
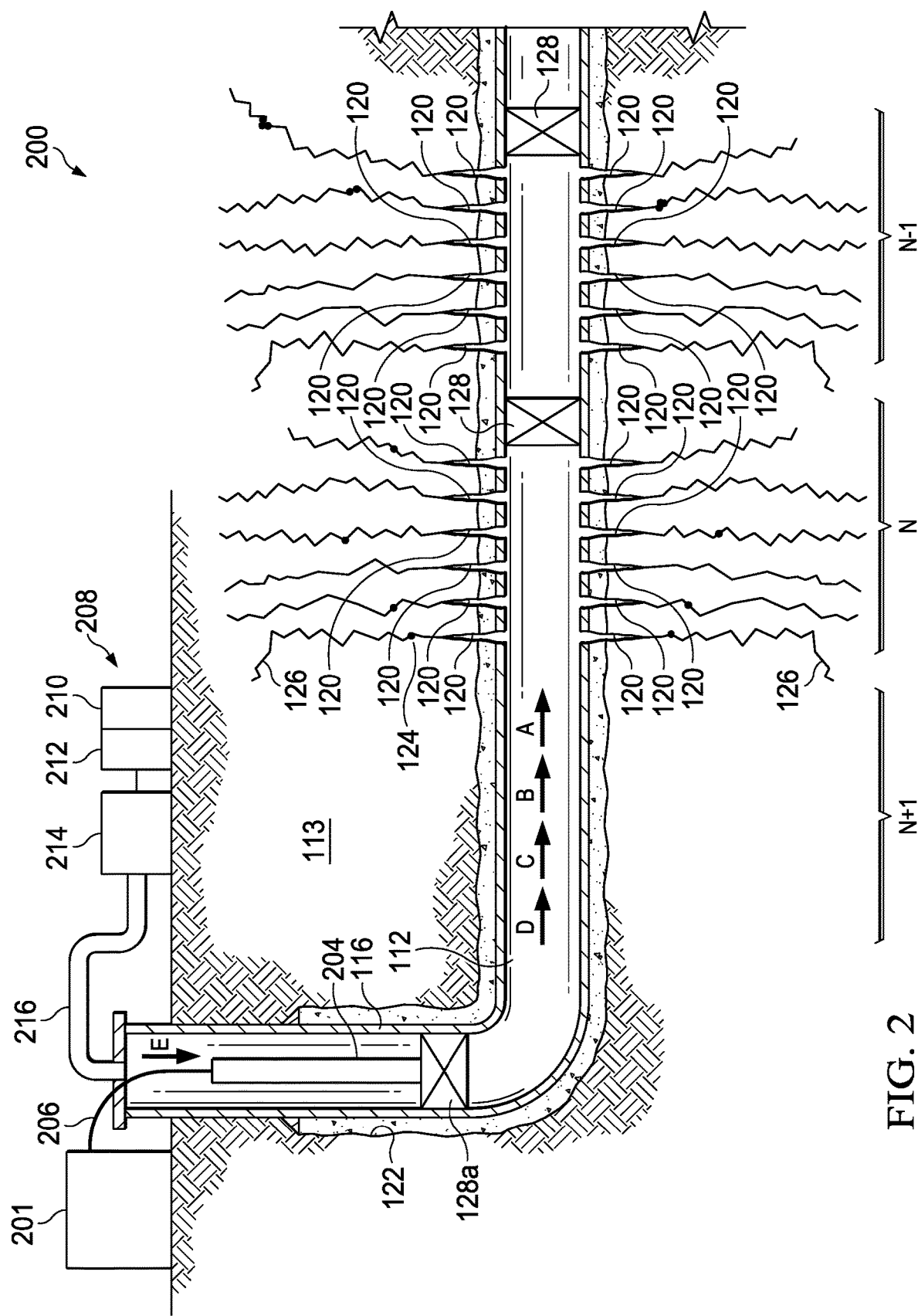
FIG. 2 illustrates a pump down system including perforating equipment for a plug and perf method, in accordance with examples of the present disclosure.

FIG. 2 illustrates a pump down system 200 including perforating equipment 201 for a plug and perf method, in accordance with examples of the present disclosure. The system 200 may be implemented offshore or onshore. The perforating equipment 201 may include a spool/reel and/or controller to lower/raise and fire the perforating apparatus 204 as desired via a conveyance 206 such as for example, wireline, slickline, or coiled tubing.

The pump down system 200 further includes a fluid handling system 208, which may include a fluid supply 210, mixing equipment 212, pumping equipment 214, and a wellbore supply conduit 216 coupled to the wellbore 112 extending into a subterranean formation 113. The system 200 may be exclusive of the system 100 of FIG. 1 to allow the frac equipment of system 100 to remain resin free. The system 200 allows for a separate sand consolidation process with the resin.

For example, after stage N is fractured with the proppant 124, a pre-flush A may be pumped in the wellbore 112 to prepare stage N for further treatment. In some non-limiting examples, the pre-flush A may include salt and a surfactant. Surfactants may include an anionic surfactant, a cationic surfactant, a zwitterionic surfactant, and any combination thereof.

After treatment with the pre-flush A, a resin B (e.g., furan) may be pumped into the wellbore 112 followed with a spacer C and an activator D (e.g., any suitable acid or ester). Non-limiting examples of the resin may include a two component epoxy based resin; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a hybrid polyester resin; a polyester copolymer resin; a polyurethane resin; a hybrid polyurethane resin; a polyurethane copolymer resin; an acrylate resin; and any combination thereof.

Non-limiting examples of the spacer C may include freshwater, saltwater (e.g., water containing one or more salts dissolved therein), brine (e.g., saturated saltwater produced from subterranean formations), seawater, or any combination thereof. The water may be from any source, provided that the water does not contain an excess of compounds that may undesirably affect other components in the spacer fluid.

Non-limiting examples of the activators may include acids such as hydrochloric acid, citric acid, malic acid, tartaric acid, acetic acid, phosphoric acid, maleic acid, lactic acid, ascorbic acid, acetic acid, carbonic acid, succinic acid, and/or benzoic acid. In some examples, an ester (e.g., a hydrolysable ester) may be used as the activator. In some examples, the activator may be disposed inside the resin to reduce the number of treatment stages. For example, the pre-flush may be optional, then the resin with the activator disposed therein may be pumped and subsequently displaced into the formation with the plug and perf method. This removes the need of the spacer and activator treatment stages.

A plug 128a (e.g., a frac plug or bridge plug) attached to the perforating apparatus 204 may be pumped down the wellbore 108 with fluid E (e.g., brine) to displace components A-D into the clusters 126. Amounts of each of the components may vary and may be adjusted as desired. Volume is a function of consolidation degree and number of perforations. As an example, 500 gals of each (A, B, C, D) can be used. E is the displacement fluid then equal at least to the wellbore volume.

Figure 3:
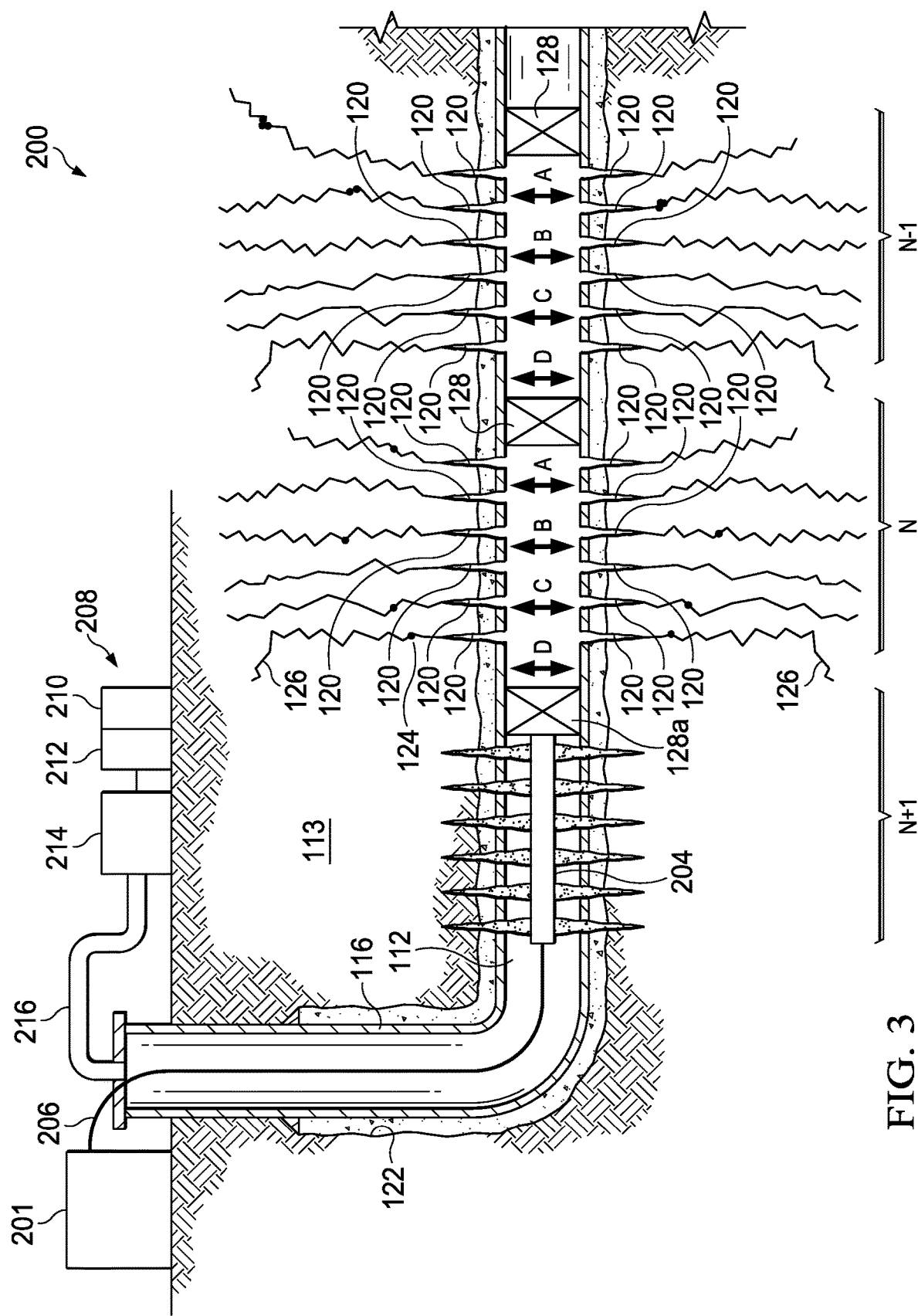
FIG. 3 illustrates setting of a plug and perforating a stage, in accordance with examples of the present disclosure.

FIG. 3 illustrates setting of the plug 128a and perforating the stage N+1, in accordance with examples of the present disclosure. The plug 128a may set between stages N and N+1, and the perforating apparatus 204 may detach (e.g., via an electrical signal) from the plug 128a and be pulled up-hole to a target location. While FIG. 3 illustrates stage N+1 as being a proximal stage being uphole from stage N, embodiments also encompass N+1 being a distal stage being further downhole from stage N.

In some examples, a setting tool may detach the plug 128a from the perforating apparatus 204. After detachment from the plug 128a, the perforating apparatus 204 may subsequently perforate stage N+1 of the wellbore 112, for example, in 30-foot increments. The activator may be slightly displaced into the formation surrounding stage N and any previously treated stages.

The aforementioned plug and perf process may be repeated for any number of stages. For example, stage N−1 was previously treated in accordance with techniques of the present disclosure. Each stage may soak in the activator and the activator may be slightly displaced into the formation.

The resin B may consolidate the proppant 124 and harden during activation. This provides mitigation of proppant flowback into the wellbore 112. Using the plug and perf method for controlling proppant flowback allows the frac equipment to remain resin free and is not linked to the frac equipment; instead, the techniques as described herein are linked to the pump down equipment and use a separate sand consolidation process with the resin. For instance, the system 100 remains resin free while the pump down system 200 is used to dispose the resin and related components into the wellbore.

Figure 4:
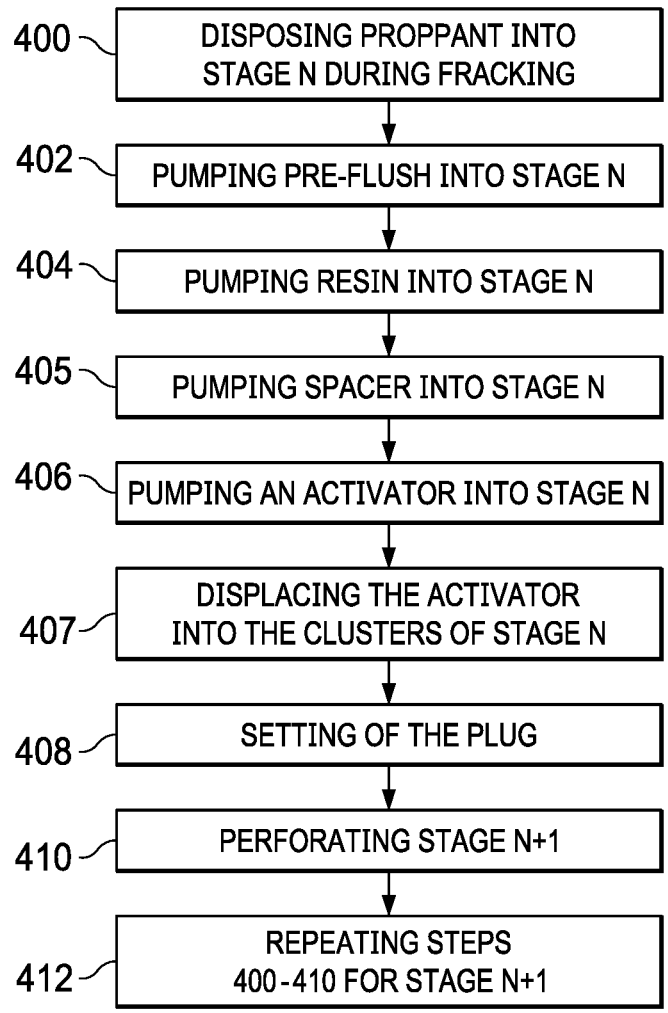
FIG. 4 illustrates an operative sequence for proppant flowback control, in accordance with examples of the present disclosure.

FIG. 4 illustrates an operative sequence for proppant flowback control, in accordance with examples of the present disclosure. At step 400, proppant may be disposed in the well during fracturing of stage N (e.g., see FIG. 1). For example, the proppant may be mixed with a fluid such as for example an aqueous base fluid via the mixing equipment, thereby forming a treatment fluid such as for example a fracturing fluid that may be pumped via the pumping equipment from the fluid supply down the wellbore at or above a fracture gradient of the subterranean formation to create (or enhance) at least one fracture (e.g., clusters 126) extending from the perforations.

At step 402, a pre-flush may be pumped into the wellbore (e.g., see FIGS. 2 and 3). The pre-flush may include salt and a surfactant. Surfactants may include an anionic surfactant, a cationic surfactant, a zwitterionic surfactant, and any combination thereof. In some examples, the pre-flush A may include brine with specific salt and surfactant (e.g., 500-2000 gals). A typical fluid may be 15% w/w NaCl brine containing a 0.25% w/v cationic surfactant.

At step 404, a resin may be pumped into the wellbore immediately after the pre-flush. The different components may be continuously pumped and switched from one component to another on the fly.

Non-limiting examples of the resin may include a two component epoxy based resin; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a hybrid polyester resin; a polyester copolymer resin; a polyurethane resin; a hybrid polyurethane resin; a polyurethane copolymer resin; an acrylate resin; and any combination thereof. In some examples, the amount of resin may be about 500 gals.

At step 405, a spacer may be pumped into the wellbore (e.g., see FIGS. 2 and 3) immediately after the resin. The different components may be continuously pumped and switched from one component to another on the fly.

Non-limiting examples of the spacer may include freshwater, saltwater (e.g., water containing one or more salts dissolved therein), brine (e.g., saturated saltwater produced from subterranean formations), seawater, or any combination thereof. The water may be from any source, provided that the water does not contain an excess of compounds that may undesirably affect other components in the spacer fluid.

At step 406, an activator may be pumped into the wellbore (e.g., see FIGS. 2 and 3) immediately after the spacer. The different components may be continuously pumped and switched from one component to another on the fly. In some examples, the activator may be included in the resin to remove the need of the spacer and activator treatment stages. Non-limiting examples of the activators may include acids such as hydrochloric acid, citric acid, malic acid, tartaric acid, acetic acid, phosphoric acid, maleic acid, lactic acid, ascorbic acid, acetic acid, carbonic acid, succinic acid, and/or benzoic acid. In some examples, an ester may be used as the activator. In some examples, amounts of the activator may range from about 500 to about 2000 gals per treatment stage.

At step 407, a plug removably attached to a perforating apparatus may be pumped down the wellbore to displace the activator and other components into the formation/clusters (e.g., see FIGS. 2 and 3). The plug may be pumped down immediately after the last component is added to the wellbore. That is, the plug and displacement fluid E push components A-D into the formation/reservoir.

At step 408, the plug may set (e.g., see FIG. 3). Each stage may soak in the activator (e.g., an acid or ester) and the activator may be slightly displaced into the formation (e.g., see FIG. 3).

At step 410, stage N+1 may be perforated (e.g., see FIG. 3). The plug may set between stages N and N+1, and the perforating apparatus may detach (e.g., via an electrical signal) from the plug and be pulled up-hole to a target location. In some examples, a setting tool may detach the plug 1 from the perforating apparatus.

After detachment from the plug, the perforating apparatus may subsequently perforate stage N+1 of the wellbore, for example, in 30-foot increments. The activator may be slightly displaced into the formation surrounding stage N and any previously treated stages. At step 412, the steps 400-410 may be repeated for stage N+1.

Accordingly, the methods of the present disclosure improve proppant flowback control and are performed during a plug and perf completion of a well. Using the plug and perf method for controlling proppant flowback allows the frac equipment to remain resin free and is not linked to the frac equipment, rather the pump down equipment is used during the plug and perf. The methods may include any of the various features disclosed herein, including one or more of the following statements.

Statement 1. A method comprising disposing a resin in at least one cluster of fractures of a stage in a wellbore; disposing an activator for the resin in the stage; displacing the activator from the wellbore and into the at least one cluster of the stage with a plug attached to a perforating apparatus; setting the plug such that the resin and the activator are contained in the stage; and perforating a subsequent stage in the wellbore.

Statement 2. The method of the statement 1, further comprising disposing the resin in at least one cluster of fractures of the subsequent stage; disposing the activator in the subsequent stage; displacing the resin and the activator into the at least one cluster of the subsequent stage with a second plug attached to the perforating apparatus; setting the second plug such that the resin and the activator are contained in the subsequent stage; and perforating an additional stage in the wellbore.

Statement 3. The method of any of the preceding statements, further comprising consolidating sand in the at least one cluster of fractures of stage with the resin.

Statement 4. The method of any of the preceding statements, further comprising consolidating sand in at least one cluster of a previously treated stage that comprises a previous resin, wherein the stage is between the previously treated stage and the subsequent stage.

Statement 5. The method of any of the preceding statements, wherein the displacing the activator step comprises pumping the perforating apparatus and the plug downhole to displace the resin and the activator into the at least one cluster of the stage.

Statement 6. The method of any of the preceding statements, wherein the disposing the activator step in the stage comprises pumping an acid or a hydrolysable ester into the stage.

Statement 7. The method of any of the preceding statements, further comprising pumping a spacer in the wellbore between the disposing of the resin and the disposing of the activator into the stage.

Statement 8. The method of any of the preceding statements, further comprising detaching the perforating apparatus from the plug after setting the plug.

Statement 9. The method of any of the preceding statements, further comprising pumping a pre-flush into the stage before disposing the resin into the stage.

Statement 10. The method of any of the preceding statements, wherein the resin and the activator are disposed into the stage simultaneously.

Statement 11. A method comprising: (A) pumping a pre-flush into a stage of a wellbore; (B) disposing a resin in at least one cluster of fractures of the stage; (C) disposing an activator for the resin in the stage; (D) displacing the activator into the at least one cluster of the stage with a plug attached to a perforating apparatus; (E) setting the plug such that the resin and the activator are contained in the stage; (F) consolidating sand for the stage; and (G) perforating a subsequent stage of the wellbore.

Statement 12. The method of any of the statement 11, further comprising repeating steps (A)-(F) for the subsequent stage and repeating step (G) for an additional stage of the wellbore.

Statement 13. The method of the statement 11 or the statement 12, further comprising consolidating sand in the at least one cluster of stage with the resin.

Statement 14. The method of any of the statements 11-13, further comprising consolidating sand in at least one cluster of a previously treated stage that comprises the resin, wherein the stage is between the previously treated stage and the subsequent stage.

Statement 15. The method of any of the statements 11-14, wherein the displacing the activator step comprises pumping the perforating apparatus and the plug downhole to displace the activator into the at least one cluster of the stage.

Statement 16. The method of any of the statements 11-15, wherein the disposing the activator step in the stage comprises pumping an acid or an ester into the stage.

Statement 17. The method of any of the statements 11-16, further comprising pumping a spacer in the wellbore between the disposing of the resin and the disposing of the activator into the stage.

Statement 18. The method of any of the statements 11-17, further comprising detaching the perforating apparatus from the plug after setting the plug.

Statement 19. The method of any of the statements 11-18, further comprising moving the perforating apparatus up-hole from the stage after setting of the plug.

Statement 20. The method of any of the statements 11-19, wherein pumping the pre-flush comprises pumping a salt and a surfactant into the wellbore.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
    disposing a resin in at least one cluster of fractures of a stage in a wellbore;
    disposing an activator for the resin in the stage;
    displacing the activator from the wellbore and into the at least one cluster of the stage with a plug attached to a perforating apparatus;
    setting the plug such that the resin and the activator are contained in the stage; and
    perforating a subsequent stage in the wellbore.

2. The method of claim 1, further comprising:
    disposing the resin in at least one cluster of fractures of the subsequent stage;
    disposing the activator in the subsequent stage;
    displacing the activator into the at least one cluster of the subsequent stage with a second plug attached to the perforating apparatus;
    setting the second plug such that the resin and the activator are contained in the subsequent stage; and
    perforating an additional stage in the wellbore.

3. The method of claim 1, further comprising consolidating sand in the at least one cluster of the stage with the resin.

4. The method of claim 1, further comprising consolidating sand in at least one cluster of fractures of a previously treated stage that comprises the resin, wherein the stage is between the previously treated stage and the subsequent stage.

5. The method of claim 1, wherein the displacing the activator step comprises pumping the perforating apparatus and the plug downhole to displace the activator into the at least one cluster of the stage.

6. The method of claim 1, wherein the disposing the activator step comprises pumping an acid or a hydrolysable ester into the stage.

7. The method of claim 1, further comprising pumping a spacer in the wellbore between the disposing of the resin and the disposing of the activator into the stage.

8. The method of claim 1, further comprising detaching the perforating apparatus from the plug after setting the plug.

9. The method of claim 1, further comprising pumping a pre-flush into the stage before disposing the resin into the stage.

10. The method of claim 1, wherein the resin and the activator are disposed into the stage simultaneously.

11. A method comprising:
    (A) pumping a pre-flush into a stage of a wellbore;
    (B) disposing a resin in at least one cluster of fractures of the stage;
    (C) disposing an activator for the resin in the stage;
    (D) displacing the activator into the at least one cluster of the stage with a plug attached to a perforating apparatus;
    (E) setting the plug such that the resin and the activator are contained in the stage;
    (F) consolidating sand for the stage; and
    (G) perforating a subsequent stage of the wellbore.

12. The method of claim 11, further comprising repeating steps (A)-(F) for the subsequent stage and repeating step (G) for an additional stage of the wellbore.

13. The method of claim 11, further comprising consolidating sand in the at least one cluster of the stage with the resin.

14. The method of claim 11, further comprising consolidating sand in at least one cluster of a previously treated stage that comprises the resin, wherein the stage is between the previously treated stage and the subsequent stage.

15. The method of claim 11, wherein the displacing the activator step comprises pumping the perforating apparatus and the plug downhole to displace the activator into the at least one cluster of the stage.

16. The method of claim 11, wherein the disposing the activator step comprises pumping an acid or an ester into the stage.

17. The method of claim 11, further comprising pumping a spacer in the wellbore between the disposing of the resin and the disposing of the activator into the stage.

18. The method of claim 11, further comprising detaching the perforating apparatus from the plug after setting the plug.

19. The method of claim 11, further comprising moving the perforating apparatus up-hole from the stage after setting of the plug.

20. The method of claim 11, wherein pumping the pre-flush comprises pumping a salt and a surfactant into the wellbore.

\* \* \* \* \*